United States Patent
Hirata

(10) Patent No.: US 6,807,477 B2
(45) Date of Patent: Oct. 19, 2004

(54) ELECTRONIC CONTROL SYSTEM AND METHOD HAVING MONITOR PROGRAM MONITORING FUNCTION

(75) Inventor: Sanae Hirata, Okazaki (JP)

(73) Assignee: Denso Corporation, Kariya (JP)

( * ) Notice: Subject to any disclaimer, the term of this patent is extended or adjusted under 35 U.S.C. 154(b) by 211 days.

(21) Appl. No.: 09/988,179

(22) Filed: Nov. 19, 2001

(65) Prior Publication Data

US 2002/0107631 A1 Aug. 8, 2002

(30) Foreign Application Priority Data

Feb. 5, 2001 (JP) ........................................ 2001-028459

(51) Int. Cl.[7] ............................ F02D 41/22; G05B 9/02
(52) U.S. Cl. ........................... 701/114; 123/396; 700/4; 700/81; 714/55
(58) Field of Search ................................ 701/107, 114, 701/110, 31; 123/396; 700/3, 4, 81; 714/55, 56

(56) References Cited

U.S. PATENT DOCUMENTS 5,440,603 A * 8/1995 Sugita ........................ 377/20
6,230,094 B1  5/2001 Ohashi et al. ............... 701/107

* cited by examiner

Primary Examiner—Andrew M. Dolinar
(74) Attorney, Agent, or Firm—Nixon & Vanderhye P.C.

(57) ABSTRACT

An ECU is equipped with an engine control microcomputer for executing engine control and a throttle control microcomputer for executing throttle control. The engine control microcomputer is programmed to execute a monitor program. A time in the engine control microcomputer is set with a predetermined time each time the monitor program is executed normally. The timer switches automatically its output logic level at a port from high to low, when the time count reaches zero. When the output logic level is switched to low, a throttle motor is disabled.

8 Claims, 5 Drawing Sheets

ELECTRONIC CONTROL SYSTEM AND METHOD HAVING MONITOR PROGRAM MONITORING FUNCTION

CROSS REFERENCE TO RELATED APPLICATION

This application is based upon and claims the benefit of Japanese Patent Application No. 2001-28459 filed on Feb. 5, 2001, the contents of which are incorporated herein by reference.

BACKGROUND OF THE INVENTION

1. Field of the Invention

The present invention relates to an electronic control system and method that are capable of detecting microcomputer malfunction by monitoring operations of one microcomputer by another one. Especially, the present invention relates to a throttle control microcomputer and method that conduct electronic throttle control of an engine of a vehicle.

2. Related Art

Electronic control systems have the monitoring function to detect a microcomputer malfunction by monitoring operations of a plurality of microcomputers against one another. For example, an electronic control system of a vehicle has an engine control microcomputer for executing engine control (spark ignition, fuel injection or the like) and a throttle control microcomputer for executing electronic throttle control. A monitoring program is provided in the engine control microcomputer, thereby to monitor the throttle control microcomputer in the engine control microcomputer. For instance, in U.S. Pat. No. 6,230,094 (JP-A-11-294252), an engine control microcomputer monitors a throttle control microcomputer. When the engine control microcomputer detects malfunction of the throttle control microcomputer, the engine microcomputer resets the throttle control microcomputer and executes the throttle control in place of the throttle control microcomputer.

In order to increase reliability and safety of the throttle control microcomputer, it is desired to monitor operations of the monitoring program itself. Therefore, in JP-A-11-294252, a watch-dog pulse is outputted periodically, and the watch-dog pulse is inputted to a watch-dog timer. Thus, the monitoring program is watched. It is, however, required to provide a hardware IC to watch the monitoring program.

SUMMARY OF THE INVENTION

It is therefore an object of the present invention to provide an electronic control system, which is capable of obviating the above problem.

It is another object of the present invention to provide an electronic control system, which is capable of attaining a monitoring function of a microcomputer.

According to the present invention, a first microcomputer is programmed to control a first object such as a fuel injection or ignition timing of an engine. The first microcomputer has a monitor program for checking malfunction of a second microcomputer periodically. The second microcomputer is programmed to control a second object such as a throttle driving motor. The first microcomputer comprises a timer and a timer setting unit. The timer increases or decreases time count in proportion to time, and switches the output logic level of its port when the time count reaches a predetermined time. The timer setting unit sets a new time count in place of the time counted by the timer when an operation of the second microcomputer is normal and the monitor program is normal.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENT

First Embodiment

An electronic control system has an electronic control unit (ECU), which has a plurality of microcomputers. The microcomputers execute engine control such as fuel injection control, fuel ignition control, electronic throttle control or the like, respectively.

Figure 1:
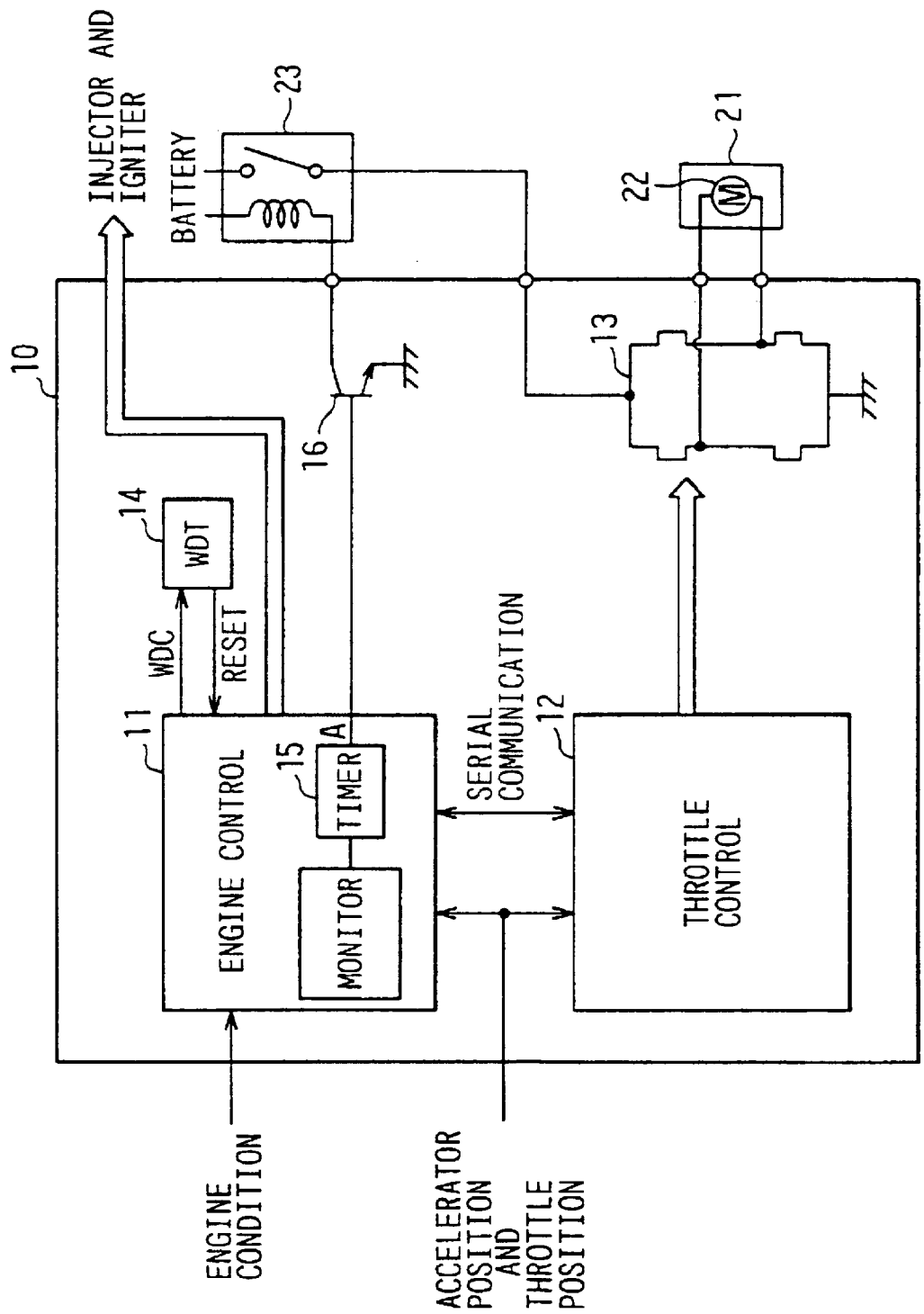
FIG. 1 is a block diagram showing an electronic control system for engines according to a first embodiment of the present invention.

As shown in FIG. 1, the ECU 10 is equipped with an engine control microcomputer 11 for executing engine control, and an electronic throttle control microcomputer 12 for executing electronic throttle control. These microcomputers 11, 12 are connected with each other, and are capable of serial communication therebetween.

The engine control microcomputer 11 receives an accelerator position signal, throttle position signal and other engine condition signals such as a rotation speed signal. It calculates required ignition timing and fuel injection amount based on the received signals, and produces control signals to an igniter and an injector.

The throttle microcomputer 12 receives the accelerator position signal and the throttle position signal. It calculates required throttle position for throttle control based on the received signals, and produces a control signal to a motor drive circuit 13, which comprises H-bridge circuit. The motor drive circuit 13 is connected to a throttle motor 22 of a throttle actuator 21. The throttle motor 22 drives a throttle valve (not shown) and adjusts an amount of intake air supplied to the engine.

The engine control microcomputer 11 is programmed to produce a WDC pulse to a WDT (watch-dog timer) 14, so that the WDT 14 may monitor the operation of the engine control microcomputer 11 based on the received watch-dog pulse. In this case, when the WDT 14 detects malfunction of the engine control microcomputer 11, for example a periodicity of the WDC pulse is out of order, the WDT 14 products a reset signal to the engine control microcomputer 11. Therefore, the engine control microcomputer 11 is reset.

The engine control microcomputer 11 has a monitor program to be executed for monitoring operations of the throttle control microcomputer 12. The engine control microcomputer 11 is programmed to execute the monitor program as a periodic interrupt routine, so that the monitor program is executed in a predetermined frequency. The engine control microcomputer 11, in executing the monitor program, for example, compares results of calculation made on the same data by the engine control microcomputer 11 and the throttle control microcomputer 12, and detects malfunction of the throttle control microcomputer 12 when the compared calculation results differ from each other.

The engine control microcomputer 11 has a timer 15. The timer 15 is set a predetermined time each time when the monitor program is accomplished normally. The timer 15 has output compare function. The timer 15 switches automatically its output logic level from high to low of its port (throttle relay port A), when the time count is decreased to zero.

The timer 15 controls a transistor 16 based on the output logic level of the throttle relay port A. Namely, when the output logic level of the throttle relay port A is high, the transistor 16 is turned on to close a motor relay 23. Therefore, the motor drive circuit 13 is supplied with electric power from a battery to drive the throttle motor 22. On the other hand, when the output logic level of the throttle relay port A is low, the transistor 16 is turned off to open the motor relay 23. Therefore, motor drive circuit 13 is not supplied with electric power from the battery to stop the throttle motor 22.

Figure 2:
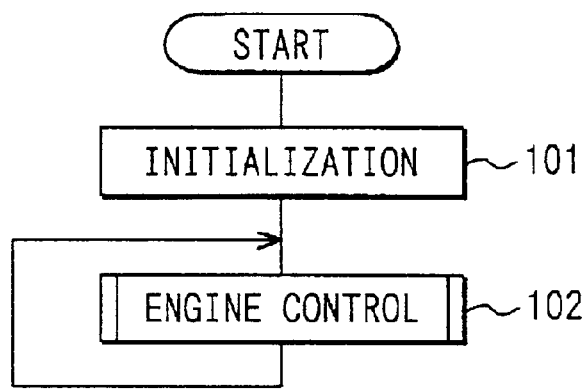
FIG. 2 is a flow diagram showing a base routine executed by an engine control microcomputer in the first embodiment.
Figure 3:
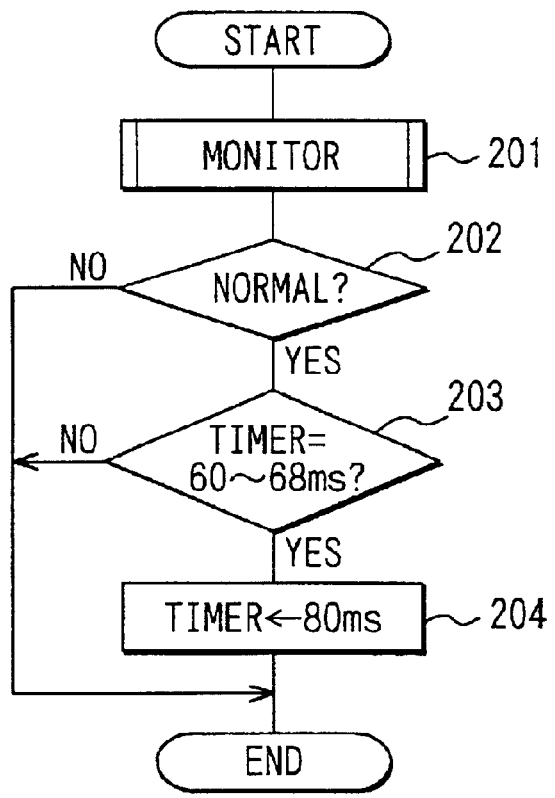
FIG. 3 is a flow diagram showing an interrupt routine executed by the engine control microcomputer in the first embodiment.

The engine control microcomputer 11 is programmed to execute a base routine shown in FIG. 2 and an interrupt routine shown in FIG. 3.

As shown in FIG. 2, after power-on of the ECU 10, the engine control microcomputer 11 executes an initialization processing at step 101. In this initialization processing, the output logic level of the throttle relay port A is initialized. Namely, when the time count of the timer 15 is not zero, the output logic level of the throttle relay port A is set high. When the time count of the timer 15 is zero, the output logic level of the throttle relay port A is set low. Next, the engine control microcomputer 11 executes an engine control processing at step 102 to calculate the required ignition timing and fuel injection amount in the known manner.

The interrupt routine, shown in FIG. 3, is executed every 16 ms. As shown in FIG. 3, the engine control microcomputer 11 executes monitor processing at step 201 in the known manner. For instance, the engine control microcomputer 11 checks (1) whether the monitor program is started and ended accurately (entry/end check), (2) whether the monitor program is executed in the predetermined order, (3) whether the throttle position signal calculated by the throttle control microcomputer 12 is equal to the throttle position signal calculated by the engine control microcomputer 11 or the like, as the monitor processing. Thus, if one of the monitor processing is detected as abnormal (malfunction), the engine control microcomputer 11 sets an error flag indicative of the malfunction. Here, it is possible to dispense with above mentioned (1) or (2).

Next, at step 202, the engine control microcomputer 11 checks whether the monitor processing at step 201 is normal. The processing advances to step 203 in response to an affirmative determination (YES). Then, the engine control microcomputer 11 checks whether the time count of the timer 15 is in a predetermined acceptable region (e.g., 60 to 68 ms). Thus, the processing advances to step 204 in response to an affirmative determination (YES), and the engine control microcomputer 11 sets a predetermined time (e.g., 80 ms) as the initial time count of the timer 15.

The processing advances to end this routine in response to a negative determination (NO) at step 202 or 203. Namely, when the monitor processing detects the malfunction at step 201, or when the executing timing of the monitor program is not equal to predetermined timing (e.g., 16 ms), timer 15 is not set with the predetermined time (e.g., 80 ms).

Figure 4:
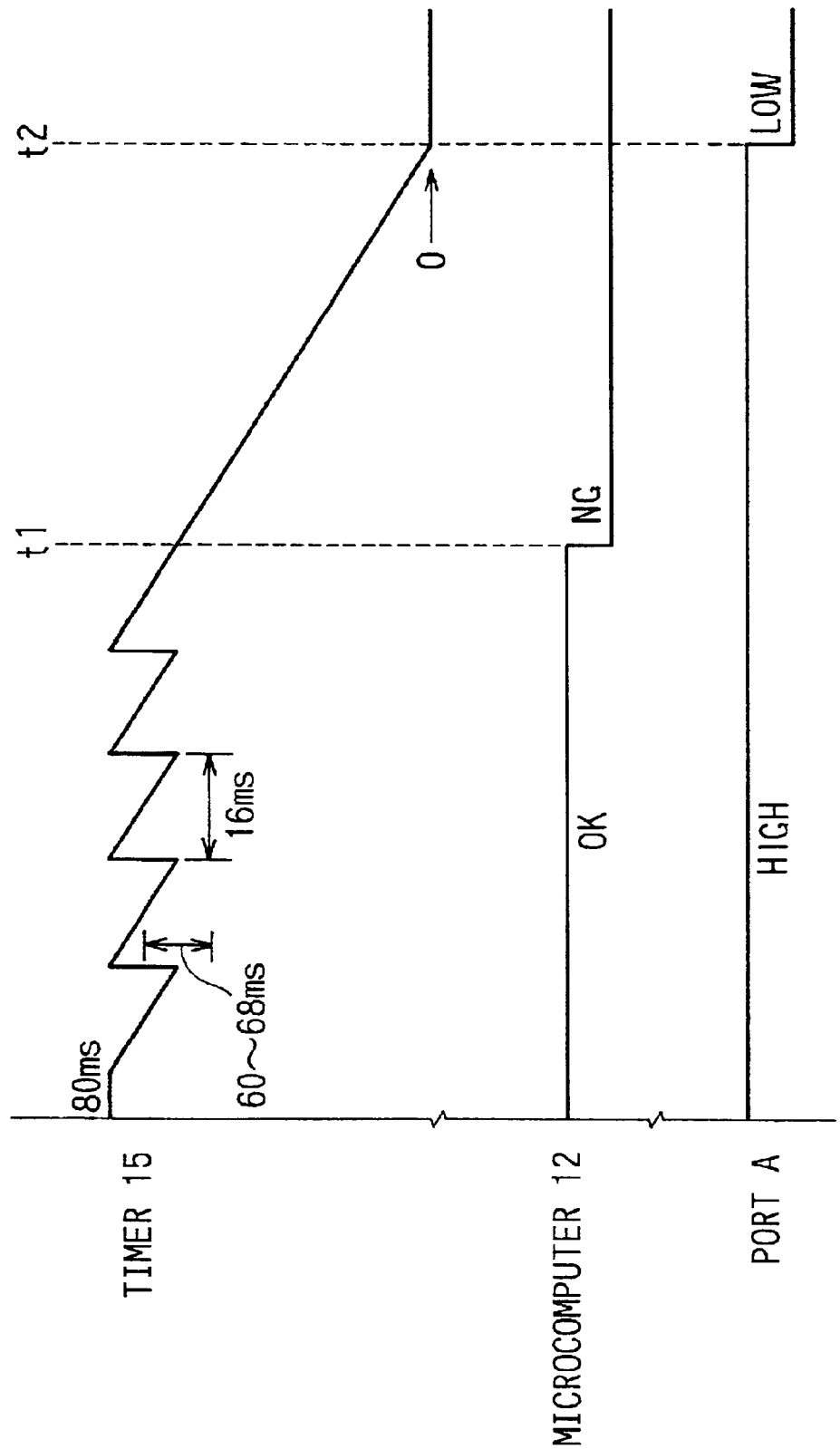
FIG. 4 is a timing diagram showing a check processing of the monitor program in the first embodiment.

As shown in FIG. 4, before timing t1, the throttle control microcomputer 12 is not detected as malfunctioning and the monitor program is executed normally. Therefore, the timer 15 is set with the predetermined time (80 ms) at every 16 ms indicative of the executing interval of the monitor program. Namely, before 16 ms passes, the timer 15 is set with the predetermined time over and over again. In this case, the output logic level of the throttle relay port A is maintained high. Thus, the motor relay 23 is closed, and the electric power supplied to the throttle motor 22 is maintained.

On the other hand, for example, when the malfunction of the throttle control microcomputer 12 is detected or the monitor program is not executed normally at timing t1, the timer 15 will never be set with the predetermined time (80 ms). Then, at timing t2, when the time count of the timer 15 is zero, the output logic level of the throttle relay port A is switched low. Thus, the motor relay 23 is opened, and the electric power supplied to the throttle motor 22 is stopped. As a result, controlling the amount of intake air supplied to the engine by the throttle actuator 21 is stopped.

According to this embodiment, the timer function that is equipped in normal microcomputer is used for monitoring operation. Therefore, a hardware IC for the monitoring operation is not required. Therefore, ECU 10 can be simplified.

Furthermore, when the malfunction of the throttle control microcomputer 12 is detected or the malfunction of the monitor program is not executed as designed, the output logic level of the throttle relay port A is switched from high to low, and electronic throttle control is stopped. Thus, the ECU 10 monitors properly whether electronic throttle control is executed normally.

Moreover, the ECU 10 monitors the interval of executing time of the monitor program based on the time count of the timer 15. When the interval is within the acceptable region, the timer 15 is set with the predetermined time (80 ms). Therefore, when the monitor program is executed in too short time or too long time, the ECU 10 detects the malfunction of the throttle control microcomputer 12 or the monitor program.

In this embodiment, it is possible to set the predetermined time for monitoring the WDC pulse equal to the predetermined time for monitoring the monitor program. The predetermined time to set in the timer 15 may be suitably changed.

Second Embodiment

Figure 5:
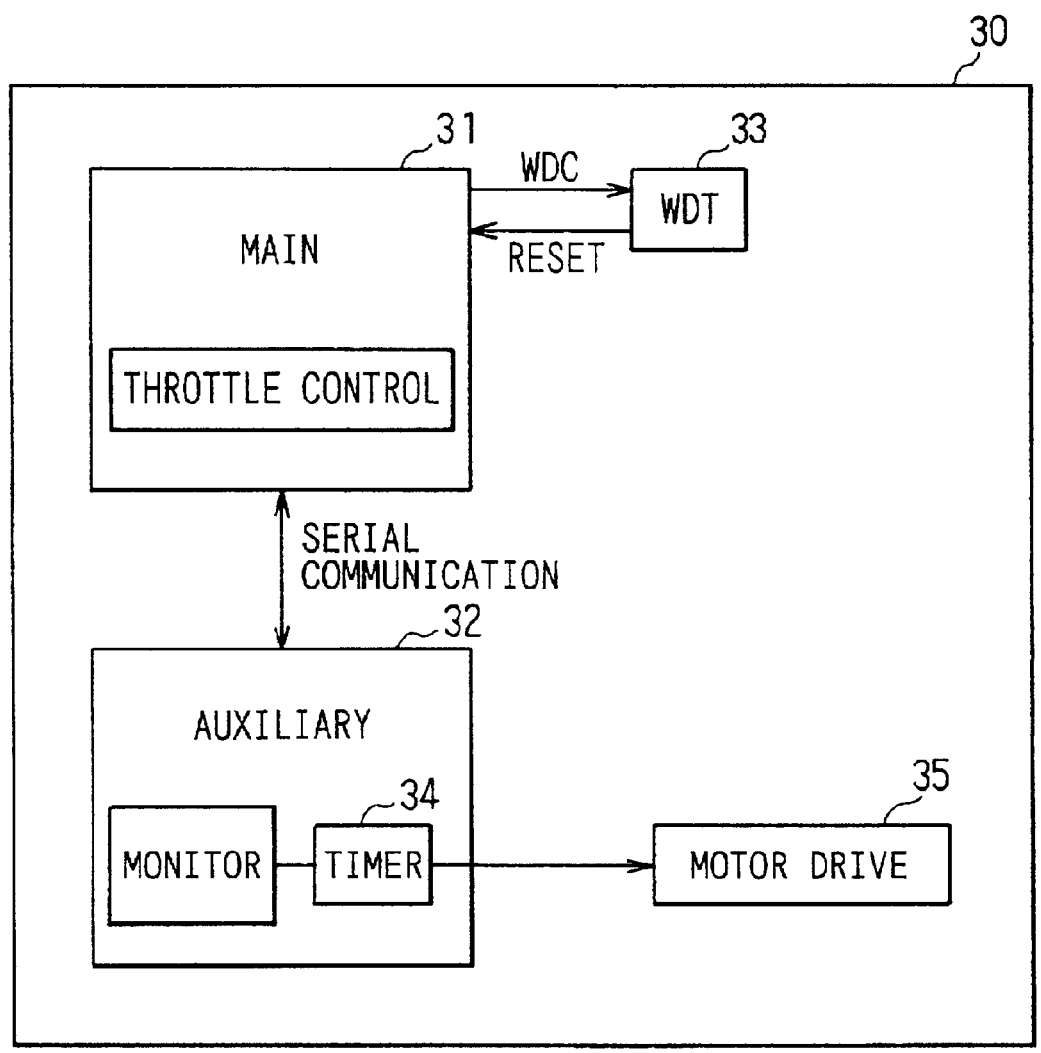
FIG. 5 is a block diagram showing an electronic control system for engines according to a second embodiment of the present invention.

In the second embodiment, shown in FIG. 5 one microcomputer (main microcomputer) 31 of an ECU 30 has both engine control function and throttle control function, and another microcomputer (auxiliary microcomputer) 32 has only monitoring function. For instance, a 32-bit microcomputer is used as the main microcomputer, and a 16- or 8-bit microcomputer is used as the auxiliary microcomputer 32.

As shown in FIG. 5, ECU 30 is equipped with the main microcomputer 31 and the auxiliary microcomputer 32. The main microcomputer 31 executes engine control and electronic throttle control. Namely, the main microcomputer 31 calculates the required ignition timing and fuel injection amount for engine control, and throttle position for throttle control. The main microcomputer 31 outputs a WDC pulse to WDT 33. Thus, the WDT 33 monitors malfunction of the main microcomputer 31 as in the first embodiment. Incidentally, a signal based on the calculated results by the main microcomputer 31 is transmitted to the motor drive circuit 35 through the auxiliary microcomputer 32.

The auxiliary microcomputer 32 monitors the throttle control executed by the main microcomputer 31. The auxiliary microcomputer 32 has a monitor program for executing at every predetermined interval. According to the monitor program, the auxiliary microcomputer 32 detects whether the calculation of the main microcomputer 31 is accurate, whether the monitor program is started and ended accurately or whether the monitor program is executed in the predetermined order.

The auxiliary microcomputer 32 has a timer 34. The timer 34 is set with a predetermined time every time when the monitor program is accomplished normally. The timer 34 has output compare function. The timer 34 is switched automatically from high to low, when the time count is decreased to zero. Thus, throttle motor driving is controlled by a motor drive circuit 35 based on the output logic level of the port.

In this case, when the time counted by the timer 34 is not zero, the throttle motor is operable. On the other hand, when the time counted by the timer 34 is zero, the throttle motor is not operable.

Third Embodiment

Figure 6:
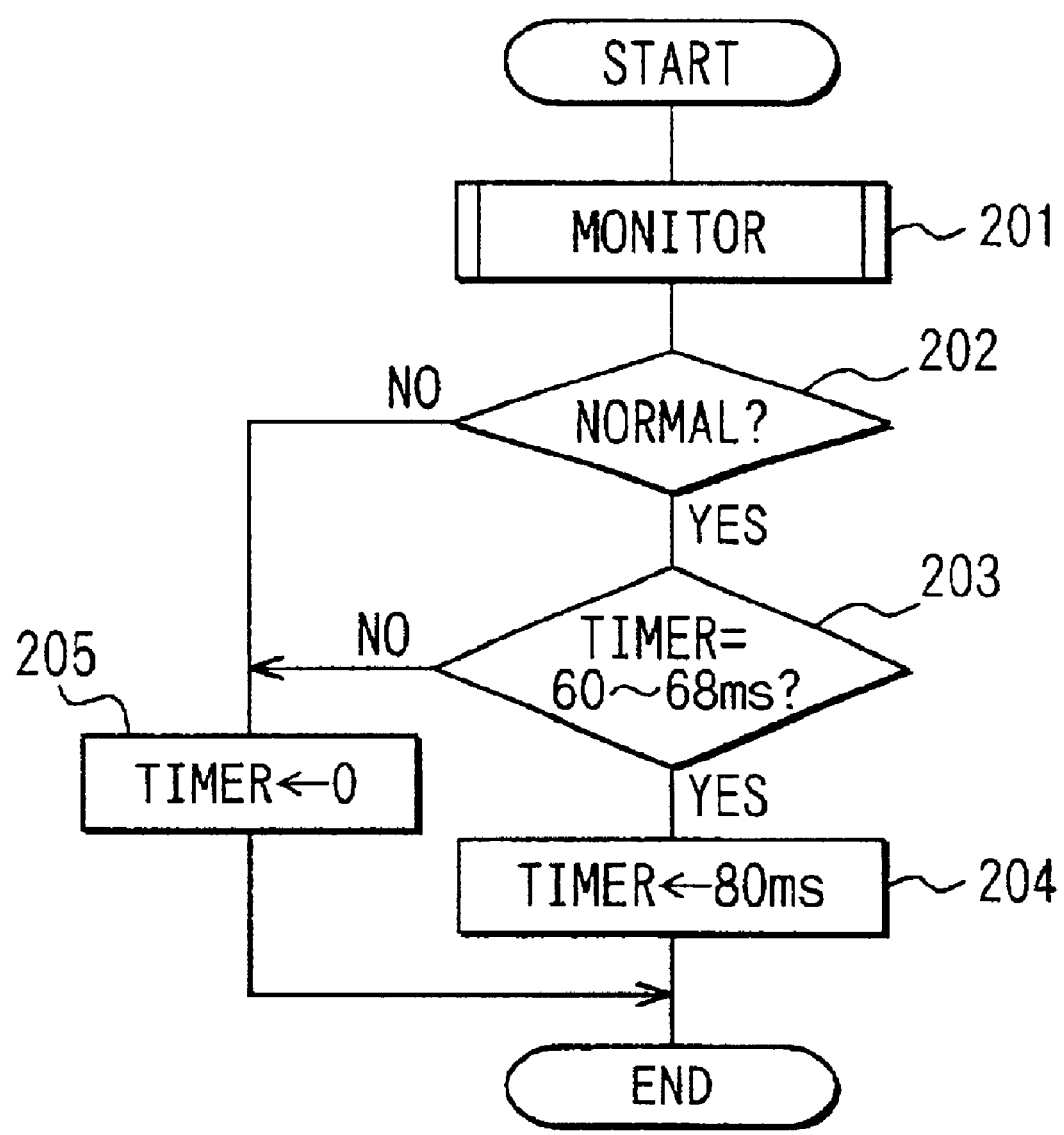
FIG. 6 is a flow diagram showing an interrupt routine executed by the engine control microcomputer according to a third embodiment of the present invention.

As shown in FIG. 6, in the third embodiment, the monitor processing advances to step 205 in response to a negative determination (NO) at step 202 or 203. Thus, the engine control microcomputer 11 sets zero as the time count of the timer 15, and the output logic level of the throttle relay port A is switched to low, immediately. Therefore, when the malfunction of the throttle control microcomputer 12 is detected or the monitor program is not executed normally, the throttle motor 22 is stopped, immediately. Thus, ECU 10 executes throttle control more safely.

Modifying Embodiment

In the first to third embodiments, a timer for increasing time count can be utilized in place of the timer 15, 34 for decreasing time count. When the time counted by the timer reaches a predetermined time, an output logic level of a port is switched. In this case, when the throttle control function is not detected as malfunctioning and the monitor program is executed normally, the timer is reset to zero each time. To the contrary, when the throttle control function is detected as malfunctioning and the monitor program is not executed normally, the timer is not reset to zero. Thus, when the timer is not reset, the time counted by the timer reaches the predetermined time (e.g., 80 ms), the output logic level of the port is switched.

The microcomputer that monitors the other can be adapted to a microcomputer utilized for ABS or bag air.

What is claimed is:

1. An electronic control system comprising:

first and second microcomputer programmed to control a first object and a second object, respectively;

the first microcomputer having a monitor program for checking a malfunction of the second microcomputer at a predetermined interval;

the first microcomputer including timer means and timer setting means;

the timer means counting time and switching an output logic level of a port when a time count reaches a predetermined value; and the timer setting means setting a new time count in place of the time counted by the timer means when the second microcomputer is operating normally and the monitor program is executed normally, wherein the timer setting means monitors an interval of executing the monitor program and sets the new time count when that interval is within a predetermined time range having a beginning time point and an end time point.

2. An electronic control system as in claim 1, wherein:

the timer decrease the time count and switches the output logic level when the time count reaches zero; and the timer setting means sets a new time count which is longer than the predetermined interval for executing the monitor program.

3. An electronic control system as in claim 1, wherein:

the monitor program determines whether a calculating result by the second microcomputer is normal, and determines whether start timing and end timing monitor program execution is normal or whether execution procedure of the monitor program is in order; and the timer setting means sets the new time count when the first and second determination are affirmative.

4. An electronic control system as in claim 1, wherein:

the second microcomputer executes an electronic throttle control process; and the first microcomputer stops electronic throttle control when the time count reaches the predetermined value.

5. An electronic control method for a system having a first microcomputer and a second microcomputer, the first microcomputer including a monitor program and a timer, the electronic control method comprising:

monitoring, by the first microcomputer, an operation of the second microcomputer based on the monitor program at successive predetermined intervals;

counting, by the timer of the first microcomputer, time from a predetermined value which is set larger than the predetermined interval;

checking, by the first microcomputer, whether the time counted by the counting step is within a predetermined time range, the predetermined time range having a beginning time point and an end time point, defined by the predetermined value and the predetermined interval; and determining, by the first microcomputer, abnormality of monitor program execution when the time counted is outside the predetermined range time range having the beginning time point and an end time point.

6. An electronic control method as in claim 5, further comprising:

changing, by the first microcomputer, the time counted to the predetermined value when the time counted is within the predetermined time range.

7. An electronic control method as in claim 6, wherein:

an abnormality is determined after the time counted reaches the predetermined value.

8. An electronic control method as in claim 6, wherein:

an abnormality is determined immediately when the time counted becomes outside the predetermined time range.

* * * * *